United States Patent [19]

Diaz et al.

[11] Patent Number: 4,492,592
[45] Date of Patent: Jan. 8, 1985

[54] COMBINED DESICCATION OF SUBSTANTIALLY SUPERCRITICAL $CO_2$

[75] Inventors: Zaida Diaz, Houston; James H. Miller, Katy, both of Tex.

[73] Assignee: Shell Oil Company, Houston, Tex.

[21] Appl. No.: 501,583

[22] Filed: Jun. 6, 1983

[51] Int. Cl.³ .............................................. B01D 53/04
[52] U.S. Cl. ........................................ 62/18; 55/68; 55/75; 55/76; 423/437
[58] Field of Search .................. 423/437; 62/17, 18, 62/20; 55/68, 74, 75, 76; 166/267, 272

[56] References Cited

U.S. PATENT DOCUMENTS 3,100,685  8/1963  Duffey ............................ 423/437
3,317,278  5/1967  Ruhemann et al. ............. 423/437

Primary Examiner—Frank Sever

[57] ABSTRACT

The drying of moist $CO_2$ at conditions above or near the critical point of $CO_2$ is improved by contacting the $CO_2$ with an electrolyte desiccant adsorbed on a permeable solid desiccant.

5 Claims, 2 Drawing Figures

— PURE $CO_2$
--- 96 m% $CO_2$ & 4 m% $N_2$

COMBINED DESICCATION OF SUBSTANTIALLY SUPERCRITICAL $CO_2$

BACKGROUND OF THE INVENTION

This invention relates to a process for drying moist $CO_2$ at conditions above or near the critical point (87.9° F. and 1071 psia). More particularly, the present invention relates to an efficient process for drying supercritical or nearcritical $CO_2$ to an extent materially reducing its corrosivity without the severe loss of desiccant and contamination of $CO_2$ which happens in drying $CO_2$ with a glycol such as triethylene glycol at conditions above or near the critical point of $CO_2$.

Numerous desiccants and systems for drying gases are described in U.S. patents such as the following: U.S. Pat. No. 2,812,830 describes a system using triethylene glycol (TEG) and recycling partially spent TEG while removing most of the water with dry TEG. U.S. Pat. No. 3,390,511 describes a gas drying system using aqueous electrolyte desiccant adsorbed on water soluble carrier pellets such as sodium chloride pellets. U.S. Pat. No. 3,609,942 describes the drying of wet hydrocarbon gases at pressures of from about 500 to 2000 psig with ethylene glycol or other glycols. U.S. Pat. No. 3,750,369 describes a system for regenerating spent liquid desiccants such as a glycol or hygroscopic solution of electrolytes such as lithium, calcium or other chloride salts. U.S. Pat. No. 3,885,926 describes an aqueous desiccant solution of calcium chloride and magnesium nitrate which is said to be particularly suitable for dehydrating hydrocarbon gases. U.S. Pat. No. 4,235,289 describes a system for producing supercritical $CO_2$ from a subterranean reservoir and drying it with TEG to provide dried supercritical $CO_2$. U.S. Pat. No. 4,344,486 describes an oil recovery process for producing $CO_2$ containing contaminants such as hydrocarbons and hydrogen sulfides from an underground reservoir, burning the mixture to form a concentrated carbon dioxide stream, compressing and dehydrating the stream with a molecular sieve or ethylene glycol water-removing arrangement and injecting the treated $CO_2$.

Such patents contain no suggestion of any significant problem due to a glycol such as TEG remaining dissolved in the dehydrated $CO_2$.

An article in Oil and Gas Journal, Nov. 8, 1971, page 53, describes preliminary plans for pipelining $CO_2$ to the Sacroc unit of the Wasson field for use in oil recovery. The article describes the desirability of maintaining a pressure greater than about 1400 psig to keep the $CO_2$ supercritical and indicates that a maximum of 50 parts per million of water in the dehydrated $CO_2$ would adequately prevent corrosion of the pipeline. It also indicates that, in pilot tests, drying with TEG appeared satisfactory but "little experience exists in large scale dehydration of $CO_2$ produced from natural gas wells". An Oil and Gas Journal article (Jan. 3, 1983, page 92) relating to $CO_2$ injection for enhanced oil recovery, indicates that the gas should be dehydrated to a water dew point of about 10° F. below the minimum ambient temperature and that TEG offers the best combination of ease in operation and economics since dew points obtained with it are normally within the range required for $CO_2$ handling systems. An Oil and Gas Journal article (Mar. 21, 1983, page 160) indicates that "Corrosion by $CO_2$ can be prevented in gas transmission lines by dehydrating the gas to less than 60% relative humidity for the coldest portion of the pipeline." and also that oil-soluble amine film-forming inhibitors can be used in $CO_2$-pipelines.

In summary, the prior art teachings and beliefs indicate (1) the desirability of pipelining $CO_2$ as a supercritical single phase fluid, (2) the desirability of drying such $CO_2$ to a non-corrosive moisture content, and (3) an expectation that triethylene glycol is the best dessicant for such a drying operation.

SUMMARY OF THE INVENTION

The present invention relates to a process for drying water-containing $CO_2$, at conditions above or near its critical point, to a substantially noncorrosive water content, while maintaining high drying efficiency and minimizing desiccant loss and product contamination due to desiccant solubility. The supercritical or near-critical $CO_2$ is flowed into and out of contact with a lithium and/or calcium halide supported on a permeable mass of water-insoluble solid desiccant.

DESCRIPTION OF THE INVENTION

The present invention is, at least in part, premised on a discovery that a significant problem exists in a large scale use of the previously suggested procedures for drying supercritical or nearcritical $CO_2$ to a substantially noncorrosive degree. The desiccant previously considered to be the most cost effective and versatile, triethylene glycol, has been found to exhibit an undesirably high solubility which varies widely with relatively small variations in pressure and temperature. Aqueous liquid desiccant solutions of lithium and/or calcium halides (such as the chlorides) have a suitably low solubility in supercritical or nearcritical $CO_2$. They also have a high water capacity, but they have a drying efficiency which is incapable of removing water from said $CO_2$ to the low levels required for corrosion protection.

Applicants have discovered that it is possible to achieve a high capacity for water removal, small desiccant loss and a high drying efficiency by a two-component desiccant system in which an electrolyte desiccant is adsorbed or supported on a bed of water-insoluble solid desiccant. Supported electrolytes such as $CaCl_2$ or LiCl on alumina have the following advantages for nearcritical $CO_2$ drying:

1. very low solubility in $CO_2$ (i.e., small desiccant losses),
2. high water capacity,
3. good drying efficiency (low dewpoints),
4. the support itself is a desiccant, and it is also rigid, so that it does not collapse and create channeling problems, and
5. regeneration in situ is probably feasible, provided the bed is not totally exhausted.

In drying experiments using various physical forms of the electrolytes, it has been found that the supported systems provide the most efficient utilization of the electrolytes and the highest reliability.

Particularly attractive sources of $CO_2$ for use in oil recovery operations comprise subterranean reservoirs such as those in the McElmo Dome and Doe Canyon fields. In a particularly attractive $CO_2$ producing procedure, the $CO_2$ is produced as a supercritical single-phase fluid. This plus the desirability of supercritical pipelining provides a desirability for dehydrating the $CO_2$ at conditions above but near the critical point. In such operations, changes over several orders of magnitude can occur in the solubility of triethylene glycol in the $CO_2$ being dehydrated.

Figure 1:
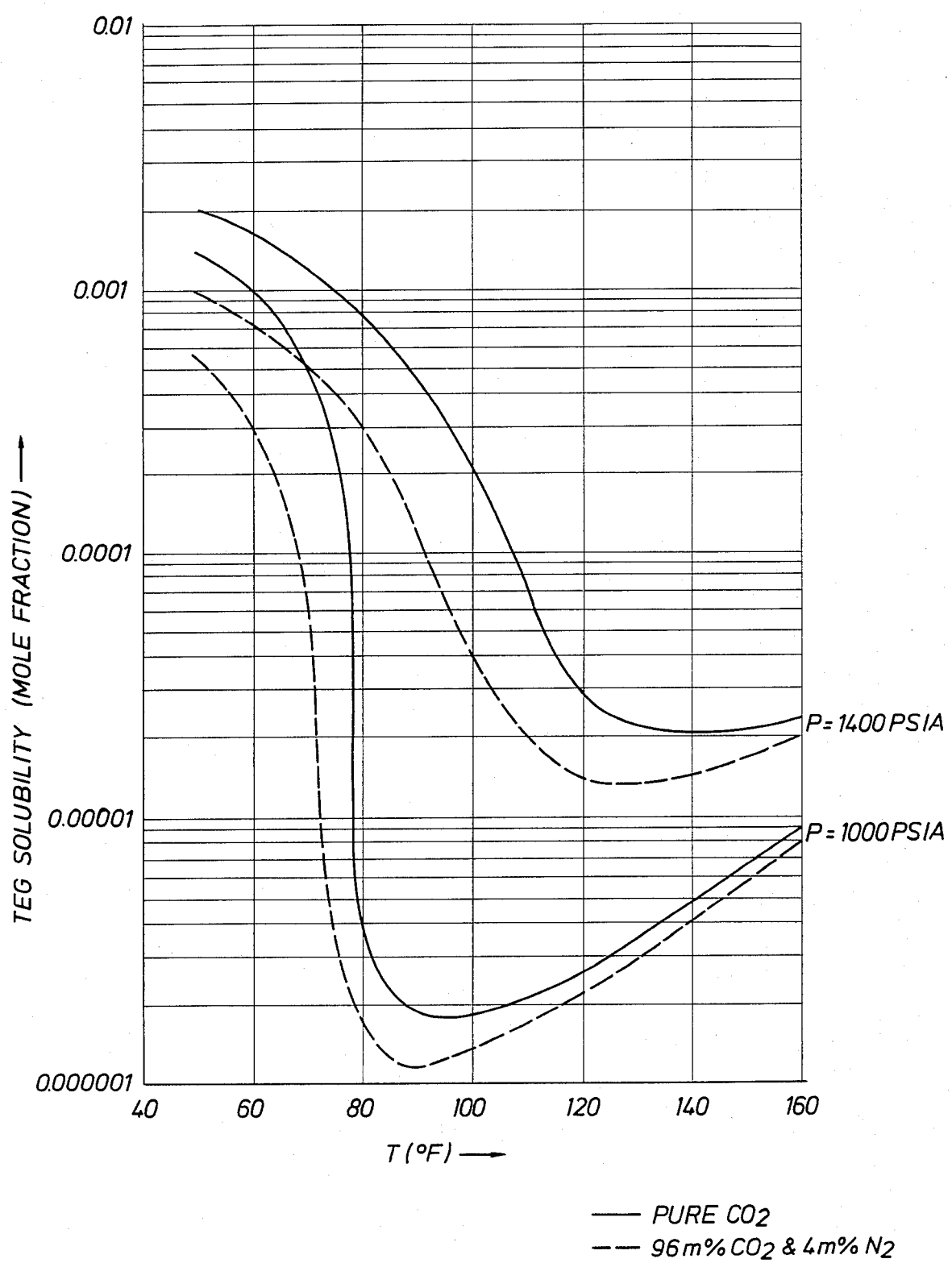
FIG. 1 illustrates a plot of comparative solubilities of triethylene glycol in pure $CO_2$ and various $CO_2$-rich mixtures with increasing temperature and at various pressures.

Equation of state calculations were performed to establish correlation patterns of TEG losses in $CO_2$ drying facilities. FIG. 1 shows a graph of the calculated solubility of TEG in $CO_2$ as a function of temperature along isobars close to the critical pressure of 1071 psia with variations in temperatures near the critical temperature of 87.9° F. At pressures close to the critical pressure, the solubility reaches a minimum value as temperature increases to about the critical temperature, after which it starts increasing with increasing temperature. With increasing pressure the minimum of the curves shift to higher temperature and the sudden drop becomes less pronounced. An addition of an inert diluent such as nitrogen to the $CO_2$ results in a decrease in the solubility of TEG over the range of near critical conditions while at the same time shifting the minimum of the curves to lower temperatures.

Figure 2:
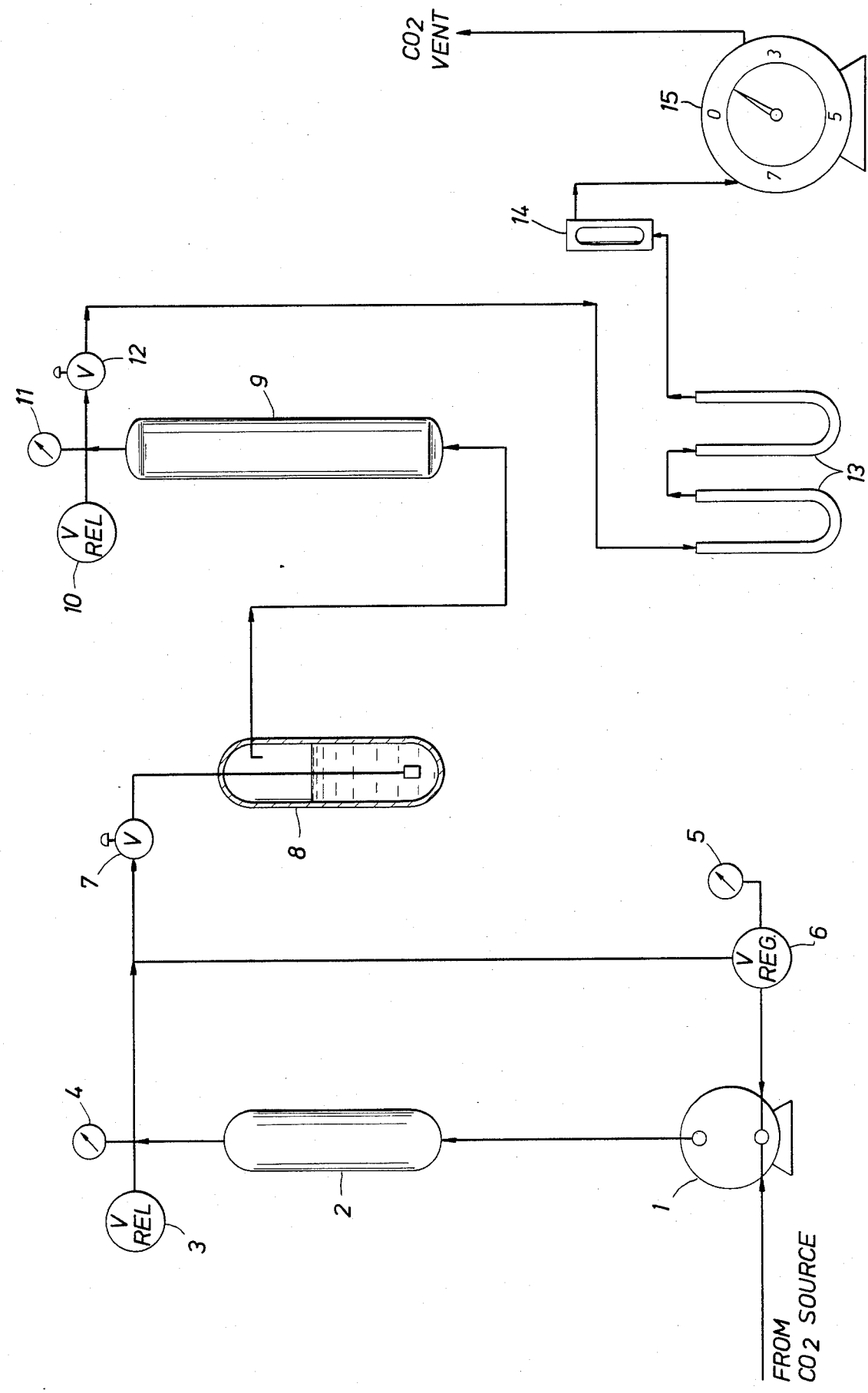
FIG. 2 is a schematic illustration of a $CO_2$-drying test apparatus suitable for use in the present invention.

FIG. 2 shows a system and procedure for determining the suitability of a particular two-component $CO_2$ drying system for drying supercritical or nearcritical $CO_2$ to a selected moisture content at selected conditions. A stream of the $CO_2$ to be tested is supplied from a $CO_2$ source (not shown) to compressor 1 and is pressurized to the selected pressure. The pressurized $CO_2$ is fed through surge tank 2, through a conduit provided with relief valve 3, gauges 4 and 5, and back-pressure regulator 6, to provide a stream at the selected pressure. The stream is metered through needle valve 7 and flowed into water sparger 8 where the $CO_2$ is substantially saturated with water.

The moist stream is then fed into the drying column 9 where it flows into and out of contact with a selected desiccant, such as lithium or calcium chloride adsorbed on a permeable bed of water-insoluble solid desiccant, such as aluminum oxide. By this treatment the moist $CO_2$ stream is substantially completely dried.

The dried stream is flowed through a conduit which is provided with relief valve 10 and gauge 11 and leads into a needle valve 12. The valve 12 is maintained at the temperature selected for the experiment, and releases a stream of the dried $CO_2$ at substantially atmospheric pressure into a series of cold traps 13 maintained at a temperature, such as about $-70°$ C., sufficient to freeze and hold substantially all of the moisture in the stream. The volume of the treated $CO_2$ is measured by means of Rotameter 14 and wet test meter 15.

In such an operation, for example, a stream of supercritical $CO_2$ is saturated with water at 1250 psi and 115° F., in the water sparger 8. Substantially all the water is then removed by flowing the stream into and out of contact with a known amount of solid desiccant consisting of an electrolyte desiccant, e.g., lithium chloride, adsorbed on a permeable bed of solid desiccant, e.g., aluminum oxide, in the drying column 9. Measurements of the amount and the water content of the treated $CO_2$ are made by means of cold traps 13 and meters 14 and 15. From those measurements determinations are made of the amount of $CO_2$ which was treated by the tested desiccants before the water content of the treated $CO_2$ reached a selected level, e.g., 0.39 milligrams per liter of $CO_2$ at room temperature and pressure. Then, to the extent required, the composition of the desiccant and/or the residence time of the $CO_2$ in contact with desiccant can be adjusted in order to substantially optimize the amount of $CO_2$ that can be treated before its water content exceeds a selected level.

The results of comparative tests of the water capacity of various electrolyte systems are listed in Table 1. These data show that, for example, at 115° F. and 1250 psi, the amount of water which was removed from the $CO_2$ before the water content of the $CO_2$ rose to 0.39 milligrams per liter was 3.8 g water/g electrolyte when lithium chloride supported on aluminum oxide was used, while the amount of water which could be similarly removed with a concentrated slurry of aqueous lithium chloride was only 0.70 g water/g electrolyte. Expressed as weight of water per total weight of adsorbent (desiccant), the amount of water which could be removed with lithium chloride supported on aluminum oxide was 0.63 g water/g adsorbent, while the amount of water which could be similarly removed with only the aluminum oxide desiccant was only 0.13 g water/g adsorbent. Thus, in the present process, the use of lithium chloride and aluminum oxide in the combined form removed 2.8 times more water than could have been similarly removed by independent parallel treatments with the same amounts of the lithium chloride in slurry form and the aluminum oxide desiccant.

TABLE 1

| | WATER CAPACITY OF VARIOUS ELECTROLYTE SYSTEMS[a] | | | |
|---|---|---|---|---|
| | 115° F., 1250 psi Weight of H$_2$O Removed at Breakthrough[d] | | 75° F., 1250 psi Weight of H$_2$O Removed at Breakthrough[e] | |
| System | g H$_2$O/g electrolyte | g H$_2$O/g adsorbent | g H$_2$O/g electrolyte | g H$_2$O/g adsorbent |
| Al$_2$O$_3$ | — | 0.13 | — | 0.12 |
| 16.4% LiCl on Al$_2$O$_3$ | 3.8[b] | 0.63[b] | 2.8 | 0.47 |
| LiCl slurry | 0.70 | — | 0 | — |
| 10% CaCl$_2$ on Al$_2$O$_3$[c] | 2.8 | 0.28 | 2.2 | 0.23 |
| CaCl$_2$ slurry | 0 | — | 0 | — |

[a]All experiments with solid desiccants were done using 5.25 g alumina plus weight of adsorbed electrolyte.
[b]Average of two runs.
[c]United Catalysts F-5 alumina.
[d]0.39 mg water per liter of $CO_2$ at room temperature and pressure (corresponding to about 25 lbs per mmscf, or about 526 ppmv)
[e]0.23 mg water per liter of $CO_2$ at room temperature and pressure (corresponding to about 15 lbs per mmscf, or about 316 ppmv)

As known to those skilled in the art, numerous devices and arrangements are known for flowing a stream of gas into and out of contact with either liquid or solid desiccants. In addition, appropriate means for avoiding problems of maintenance, corrosion prevention, and reactivation of spent desiccants, are known. Substantially any of such devices and procedures can be utilized in the present process.

The present process can be used in conjunction with corrosion inhibitors, hydrate inhibitors, and the like. For example, where produced supercritical $CO_2$ is to be flowed from producing wells to a central treating station, a hydrate inhibitor such as methanol can be added at the wellheads before the produced $CO_2$ enters gathering lines through which it is flowed into a central processing station, for example, in a manner such as that described in U.S. Pat. No. 4,235,289. Such a hydrate inhibitor can be condensed out of the $CO_2$ stream being treated by means of conventional procedures and devices.

One advantage of the present invention is the ease with which it can be adjusted to changing climatic conditions, pumping arrangements, and/or changing concentrations of fluids produced along with the $CO_2$ from subterranean reservoirs, or the like. Depending upon factors such as the conditions at which the dried $CO_2$ is injected into a pipeline, the conditions to which it will be subjected as it is transported into a use location, the number of pumping stations that will be involved, the expense and desirability of utilizing some corrosion inhibitor to maintain a selected same rate of corrosion while using less drying and thus leaving a higher water content, changes may be desirable from time to time in the maximum amount of water to be left in the dried $CO_2$.

Electrolytes which are suitable as desiccants in the present process are hygroscopic salts. The anhydrous form of the salt used should have a very low solubility in supercritical $CO_2$. Particularly suitable salts for use in the present process are lithium chloride, calcium chloride and their mixtures. Examples of other suitable salts include calcium and/or lithium bromides.

A permeable mass of solid desiccant suitable for use in the present process can comprise substantially any permeable bed of a solid material which is substantially insoluble in water or supercritical $CO_2$, tends to remain a permeable solid mass when saturated with water vapor, and is capable of removing enough water from partially dried nearcritical or supercritical $CO_2$ to provide the selected low moisture content in the $CO_2$. Particularly suitable solid desiccants are granules or other permeable porous masses of aluminum oxide. Examples of other suitable solid desiccants include silica gel.

The electrolytes are preferably adsorbed on the solid desiccants by contacting the solid desiccant with a saturated solution of the electrolyte in water at a temperature above ambient, and then cooling the mixture to deposit electrolyte particles on the solid desiccant. The impregnated solid desiccant is then separated from the aqueous solution, and it is dried to drive off substantially all coadsorbed water.

Suitable hydrate inhibitors for use in the present process comprise relatively volatile water-soluble compounds having vapor pressures near those of water, such as lower alcohols, ethers and the like. Methyl alcohol is a particularly suitable hydrate inhibitor. Examples of other suitable inhibitors include ethylene glycol.

Particularly suitable corrosion inhibitors for use in conjunction with the present process comprise commercially available oil-soluble amine, film-forming inhibitors.

What is claimed is:

1. A process for drying water-containing $CO_2$ at or above its critical point, comprising:
   providing a two-component desiccant system, including at least one electrolyte desiccant adsorbed on a permeable mass of at least one solid desiccant material; said desiccant and desiccant material being preselected to maximize water removal, minimize desiccant loss and maximize drying efficiency; and
   contacting said two-component system with $CO_2$ at or above its critical point to an extent sufficient to provide a $CO_2$ stream having a non-corrosive water content.

2. The process of claim 1 in which the electrolyte desiccant is lithium and/or calcium chloride.

3. The process of claim 1 in which the solid desiccant is aluminum oxide.

4. The process of claim 1 in which the composition of said two-component desiccant system and extent of its contact with the $CO_2$ being dried is determined by:
   saturating supercritical $CO_2$ with water at selected pressure and temperature conditions near the critical point for the $CO_2$;
   at substantially the same pressure and temperature, flowing the saturated $CO_2$ into and out of contact with selected amounts of at least one electrolyte desiccant adsorbed on a permeable mass of at least one solid desiccant which is substantially insoluble in both water and supercritical $CO_2$;
   measuring the amount and the water content of the treated $CO_2$;
   determining the amount of $CO_2$ treated before its water content reached a selected level; and
   to the extent required, adjusting the composition of the desiccant and/or the residence time of the $CO_2$ in contact with said desiccant, to substantially optimize the amount of $CO_2$ capable of being treated before its water content reaches the selected level.

5. The process of claim 4 in which the electrolyte desiccant is lithium and/or calcium chloride and the solid desiccant is aluminum oxide.

* * * * *